United States Patent
Uzun

(10) Patent No.: US 7,103,951 B2
(45) Date of Patent: Sep. 12, 2006

(54) STRUT SPRING COMPRESSION APPARATUS

(76) Inventor: Ismet Uzun, 2405 Bainbridge Blvd., West Chicago, IL (US) 60185

( * ) Notice: Subject to any disclaimer, the term of this patent is extended or adjusted under 35 U.S.C. 154(b) by 0 days.

(21) Appl. No.: 11/053,127

(22) Filed: Feb. 8, 2005

(65) Prior Publication Data

US 2006/0174465 A1 Aug. 10, 2006

(51) Int. Cl.
B23P 19/04 (2006.01)
(52) U.S. Cl. ........................... 29/227; 254/10.5
(58) Field of Classification Search .............. 29/227, 29/216–218, 225, 251, 252; 254/10.5
See application file for complete search history.

(56) References Cited

U.S. PATENT DOCUMENTS

| | | | |
|---|---|---|---|
| 3,814,382 A | 6/1974 | Castoe | |
| 4,034,960 A | 7/1977 | Kloster | |
| 4,036,473 A | 7/1977 | Kloster | |
| 4,295,034 A | 10/1981 | Spainhour et al. | |
| 4,395,020 A | 7/1983 | Spainhour | |
| 4,486,935 A | 12/1984 | Kashiwagi | |
| 4,494,289 A | 1/1985 | Matsuura | |
| 4,520,543 A | 6/1985 | Ito | |
| 4,703,547 A | 11/1987 | Togawa | |
| 5,031,294 A * | 7/1991 | Krueger | 29/227 |
| 5,172,462 A | 12/1992 | Ha | |
| 5,680,686 A | 10/1997 | Bosche et al. | |
| 5,954,314 A * | 9/1999 | Weisshaar | 254/10.5 |
| 6,129,339 A | 10/2000 | Lundgreen et al. | |
| 6,336,625 B1 * | 1/2002 | Liao | 267/66 |
| 6,719,305 B1 | 4/2004 | Lundgreen et al. | |
| 2005/0125977 A1 * | 6/2005 | Lambert | 29/227 |

* cited by examiner

*Primary Examiner*—Lee D. Wilson
(74) *Attorney, Agent, or Firm*—Meroni + Meroni, P.C.; Charles F. Meroni, Jr.; Christopher J. Scott

(57) ABSTRACT

A spring-compression apparatus for facilitating maintenance of a strut assembly comprises a guide member, a carriage assembly, and a rest assembly. The guide member comprises a first member end and a second member end. The carriage assembly comprises a jack assembly and a slide assembly. The jack assembly is operable to otherwise displace the slide assembly along the guide member. The slide assembly comprises a locator assembly, which comprises a locator extension arm and a center locator. The rest assembly comprises a center rest. A first strut end is positionable upon the center rest. The center locator is engageable with a second strut end for compressing the strut spring. The locator assembly further enables a user to remove a mounting nut from the second strut end when the strut spring is compressed, thus enabling strut assembly disassembly.

21 Claims, 6 Drawing Sheets

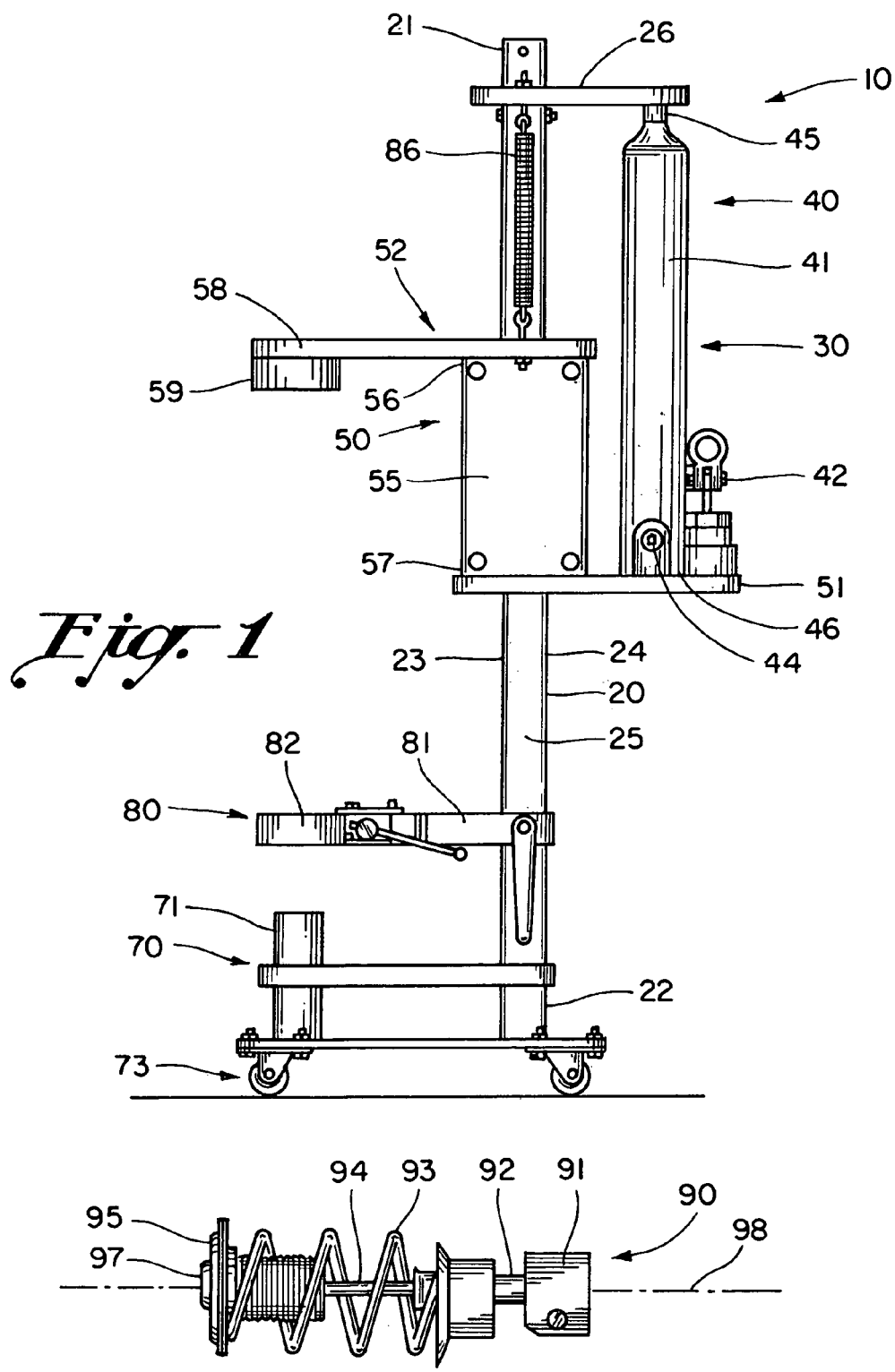

STRUT SPRING COMPRESSION APPARATUS

BACKGROUND OF THE INVENTION

1. Field of the Invention

The present invention generally relates to an apparatus for facilitating maintenance of a McPherson type strut assembly. More particularly, the present invention relates to a spring-compression apparatus for enabling users thereof to quickly and safely disassemble and reassemble a McPherson type strut assembly.

2. Description of the Prior Art

In order to properly maintain a strut assembly comprising a high tension strut spring, it is necessary to first compress the strut spring so as to remove or otherwise redirect forces away from structure maintaining the strut spring in a spring-compressed state. Once the strut spring is further compressed and forces are redirected, a mounting nut may be removed from the strut assembly and the strut spring may be decompressed to a relaxed state. The strut assembly may then be maintained or repaired as required. A number of apparatuses have been developed with an eye toward facilitating strut spring compression. Some of the more pertinent prior art relating to strut spring compression devices and the like is described hereinafter.

U.S. Pat. No. 3,814,382 ('382 patent), which issued to Castoe, discloses a Spring Compressor. The '382 patent teaches an apparatus for compressing a spring in conjunction with a shock absorber or other similar structure wherein the apparatus includes a frame upon which a spring to be compressed is mounted. An upper yoke member is slidably mounted in the frame and is operatively connected to a power source whereby a bracket is in position to act with a source yoke member to contact a spring being compressed. Downward movement of the yoke causes compression of the spring in a manner that any desired service or operation can be performed on the spring assembly being compressed. The frame further includes a safety mechanism to insure that the spring is safely compressed during service.

U.S. Pat. No. 4,295,634 ('634 patent) and U.S. Pat. No. 4,395,020 ('020 patent), which issued to Spainhour, both disclose a Strut Compressor. The '634 and '020 patents teach a spring compressor employing a fluid operated piston cylinder, which drives a first platen toward a second platen to compress a McPherson type strut mounted between the two platens. The '020 patent further teaches that the first platen may be pivotally mounted for self-adjustment to accommodate many different strut sizes and designs.

U.S. Pat. No. 4,703,547 ('547 patent), which issued to Togawa, discloses an Apparatus for Assembling a Vehicle Suspension Mechanism. The '547 patent teaches an apparatus for assembling a coil spring on a damper strut to manufacture a damper strut assembly. The apparatus includes a clamp for holding the strut in a vertical direction with the lower end of the spring attached to a lower spring seat provided on the strut. A caliper type spring depresser is provided. The depresser is mounted on a plate for movement along a substantially vertical guide rail mechanism. The plate is swingable in a substantially vertical plane so that the direction of movement of the depresser can be adjusted so as to coincide with the direction of the axis of the spring.

U.S. Pat. No. 5,031,294 ('294 patent), which issued to Krueger, discloses a Strut Spring Compressor. The '294 patent teaches an apparatus for use in assembly and disassembly of a strut assembly having a shock absorber disposed within a coil spring. The apparatus includes a frame and a first spring engagement member secured to the frame for engaging the first end of the spring of a strut. A second spring engagement member is provided connected to the frame for movement with the frame toward and away from the first spring engagement member.

U.S. Pat. No. 5,680,686 ('686 patent), which issued to Bosche et al., discloses a Strut Spring Compressor having Floating Compression Head. The '686 patent teaches an apparatus for use in assembling and disassembling a strut assembly of the type having a shock absorber axially disposed within a coil spring including a frame, a first section connected to the frame for supporting the lower portion of the spring, and a second section for holding the upper portion of the spring or upper spring seat. The second section is movable toward and away from the first section and is arranged for axially compressing the spring as the second section moves toward the first section. The second section includes guide structure, a head, linkage structure, and pivot structure. The guide structure is connected to the frame and is for allowing the second section to move toward and away from the first section. The head is mounted on the guide structure and is for positioning the spring. The linkage structure is connected to the guide structure and is for allowing the head to tilt in a first plane generally parallel to the linear axis of the spring. The pivot structure connects the head to the guide structure and is for allowing the head to tilt in a second plane intersecting the first plane.

From an inspection of these patent disclosures and other art generally known in the relevant art, it will be seen that the prior art does not teach a spring compression apparatus comprising a guide rod assembly for guiding the end of a piston rod of a strut assembly when a user reassembles an otherwise disassembled strut assembly. It is noted that the end of a piston rod must be guided through a rod-receiving aperture for receiving a mounting nut, the received mounting nut for maintaining the strut assembly in an assembled, spring-compressed state. The prior art known to exist does not teach this type of spring compression system. Thus, the prior art perceives a need for a spring compression apparatus comprising a guide rod assembly for guiding an end of a piston rod when a user reassembles an otherwise disassembled strut assembly. In this regard, the prior art does not teach structure for guiding the end of a piston rod through a rod-receiving aperture, which aperture is typically sized and shaped for the maintaining the axis of the piston rod, said aperture being critically sized and shaped. Given the high tension of a typical strut spring, it is often quite difficult for assembly workers to reassemble a strut assembly given that the end of the piston rod must be guided through the rod-receiving aperture. Thus, it is contemplated that the present invention is patently distinct from the prior art as summarized in more detail below.

SUMMARY OF THE INVENTION

Accordingly, it is thus a primary object of the present invention to provide a spring-compression apparatus that enables users thereof to quickly and efficiently disassemble and reassemble McPherson type strut assemblies. It is a further object of the present invention to provide a spring-compression apparatus that enables users thereof to disassemble and reassemble McPherson type strut assemblies of various designs.

To achieve these and other readily apparent objectives, the present invention essentially provides a spring-compression apparatus for facilitating maintenance of a McPherson type strut assembly. In this regard, the typical McPherson type strut assembly essentially comprises a first strut end, a strut shaft, a strut spring, a piston rod, a spring seat, a mounting nut, a second strut end, and a longitudinal strut axis. The piston rod comprises a threaded rod end and the strut axis extends through the strut shaft and the piston rod. The spring seat comprises a rod-receiving aperture and the mounting nut is threadably received on the rod end adjacent the rod-receiving aperture for maintaining the strut assembly in an assembled, spring-compressed state.

The spring-compression apparatus comprises a guide member, a carriage assembly, and a rest assembly. The guide member comprises a first member end, a second member end, a member length extending intermediate the first member end and the second member end, and a transverse member cross-section. The member cross-section comprises at least four sides, the four sides including a guide side, a jack side, and opposite member sides. The first member end further comprises a jack stop, which extends outwardly from the guide member adjacent the jack side.

The carriage assembly comprises a jack assembly and a slide assembly. The jack assembly comprises a jack, jack extension means, and jack release means. The jack comprises a stop-engaging end and a pedestal-engaging end. The slide assembly comprises a jack pedestal, a locator assembly, and a carriage. The carriage comprises an arm-engaging end, a pedestal-engaging end, and a member-receiving tunnel. The guide member is slidably received in the member-receiving tunnel. The locator assembly comprises a locator extension arm, a center locator, nut access means and a longitudinal locator axis. The arm-engaging end is attached to the locator extension arm and the pedestal-engaging end is attached to the jack pedestal. The jack pedestal extends outwardly from the carriage adjacent the jack side and the locator assembly extends outwardly from the carriage adjacent the guide side for positioning the shaft claw. The jack extends intermediate the jack stop and the jack pedestal, the stop-engaging end being attached to jack stop and the pedestal-engaging end being attached to the jack pedestal.

The rest assembly comprises a center rest having a longitudinal rest axis. The rest axis and the locator axis are substantially collinear. The first strut end is positionable upon the center rest such that the strut axis is substantially collinear with the rest and locator axes. The jack extension means are operable to extend the jack and displace the locator assembly toward the center rest. The center locator is engageable with the second strut end for apparatus-compressing the strut spring. The nut access means enable a user to remove the mounting nut from the rod end when the strut spring is apparatus-compressed. The jack release means are operable to retract the jack and fully decompress the strut spring. The spring-compression apparatus thus enables strut assembly disassembly and thus facilitates maintenance of the strut assembly.

The spring-compression apparatus further comprises a piston rod guide assembly, which assembly guides the rod end of the strut assembly when a user reassembles an otherwise disassembled strut assembly. The rod end is guided through the rod-receiving aperture adjacent the second strut end and once guided therethrough, the rod end is exposed for receiving the mounting nut, the received mounting nut for maintaining the strut assembly in an assembled, spring-compressed state.

The spring-compression apparatus further comprises various axis maintenance means. The axis maintenance means may be defined by a lock assembly comprising a lock arm, a shaft claw, and claw adjustment means. The lock arm extends from the guide member adjacent the guide side for positioning the shaft claw. The shaft claw inherently has a longitudinal claw axis that is substantially collinear with the rest and locator axes. The claw adjustment means allow a user to adjust the shaft claw for variously sized strut shafts and to aid in the gripping action upon the strut shaft.

Other objects of the present invention, as well as particular features, elements, and advantages thereof, will be elucidated in, or apparent from, the following description and the accompanying drawing figures.

BRIEF DESCRIPTION OF THE DRAWINGS

Other features of my invention will become more evident from a consideration of the following brief description of patent drawings, as follows:

FIG. No. 1 is a side view of the preferred embodiment of the spring-compression apparatus.

Figure 3:
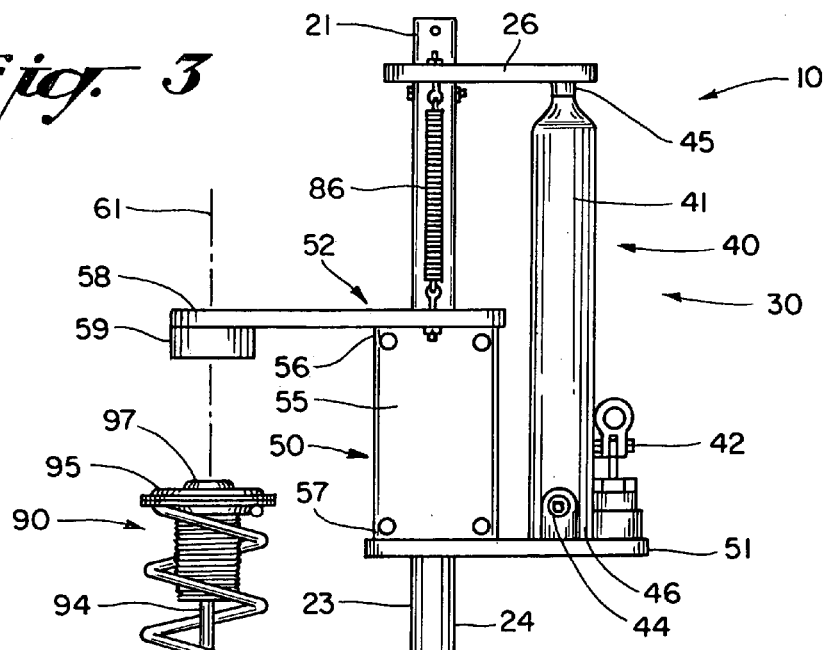
Figure 3A:
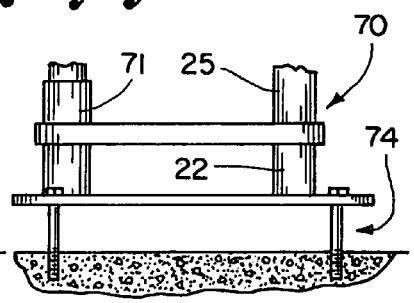
Figure 4:
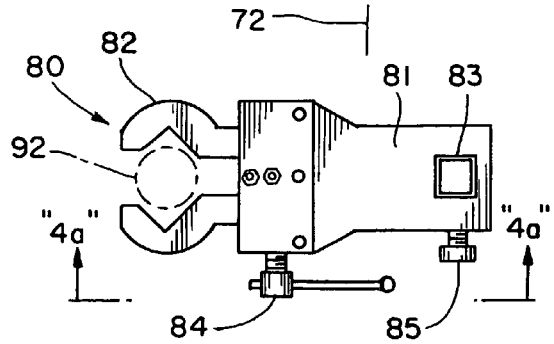
Figure 4A:
Figure 5:
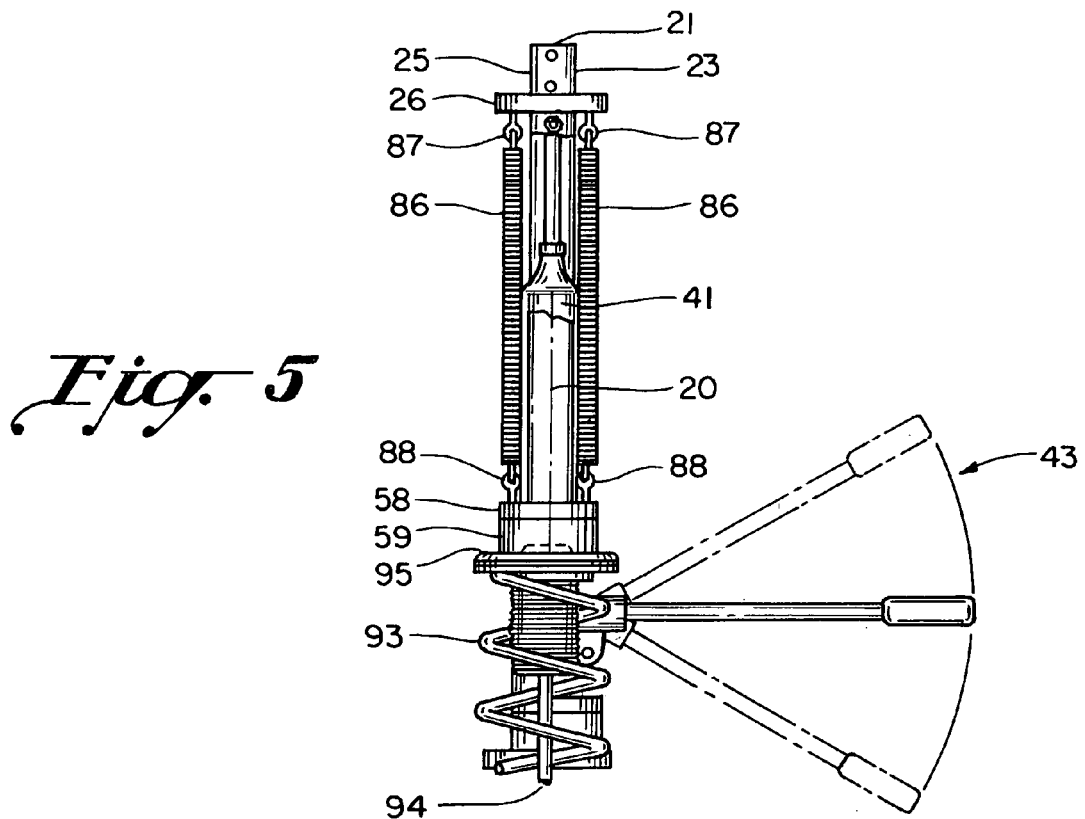
Figure 6:
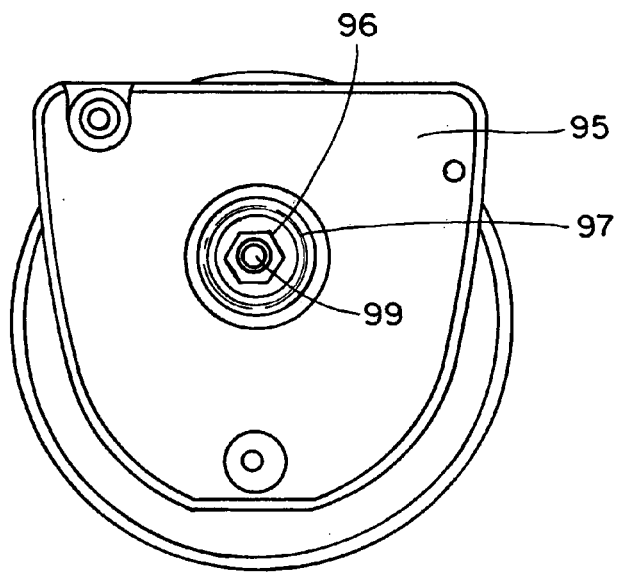
Figure 7:
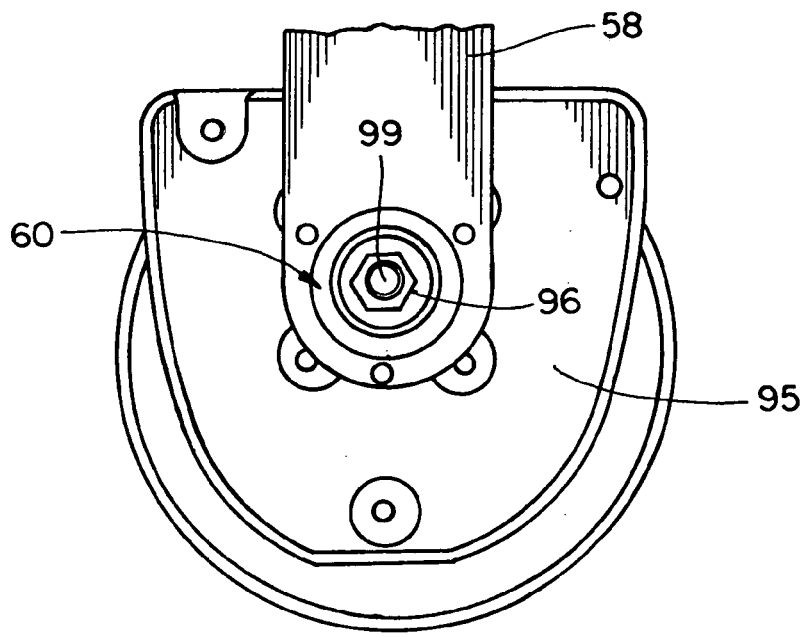
Figure 8:
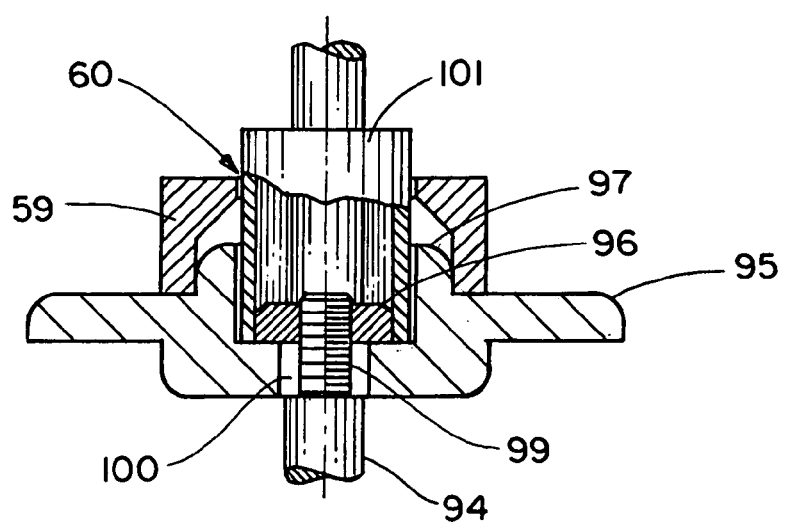
Figure 9:
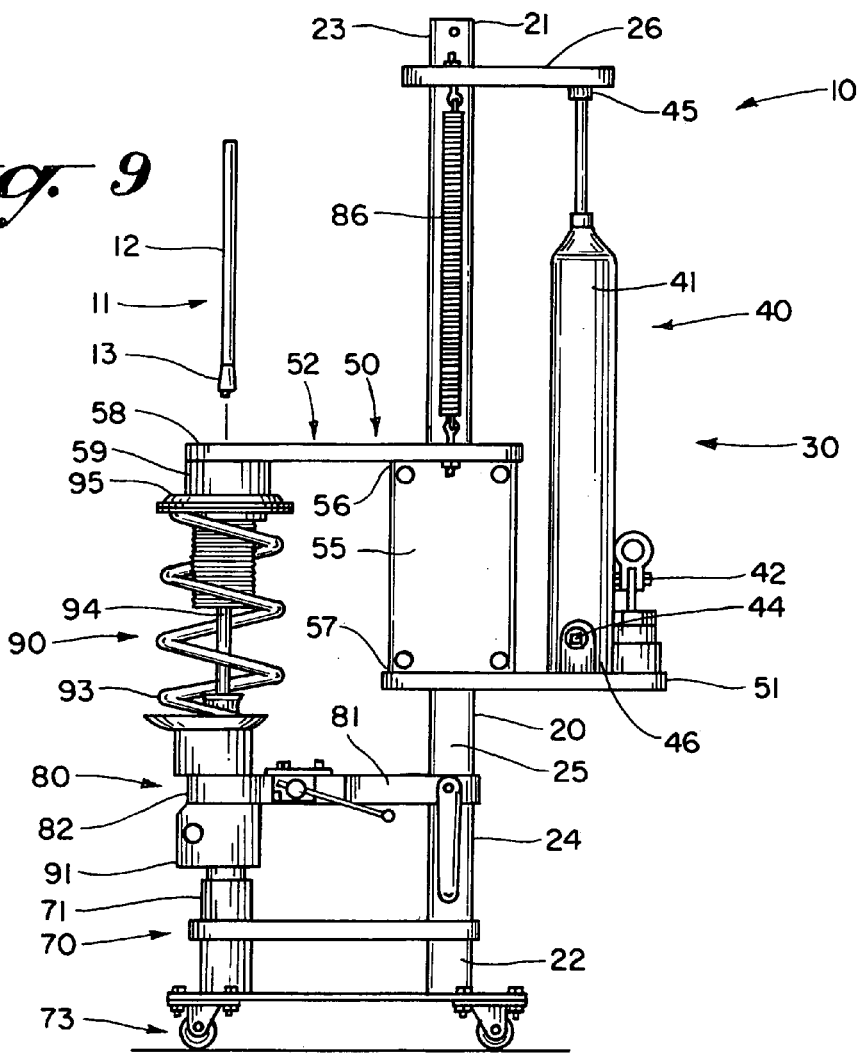
Figure 10:
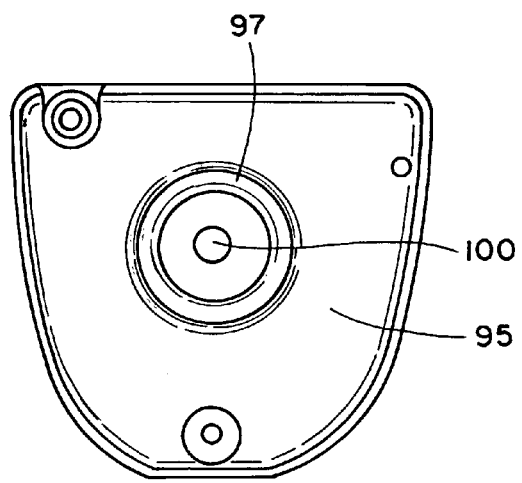
Figure 11:
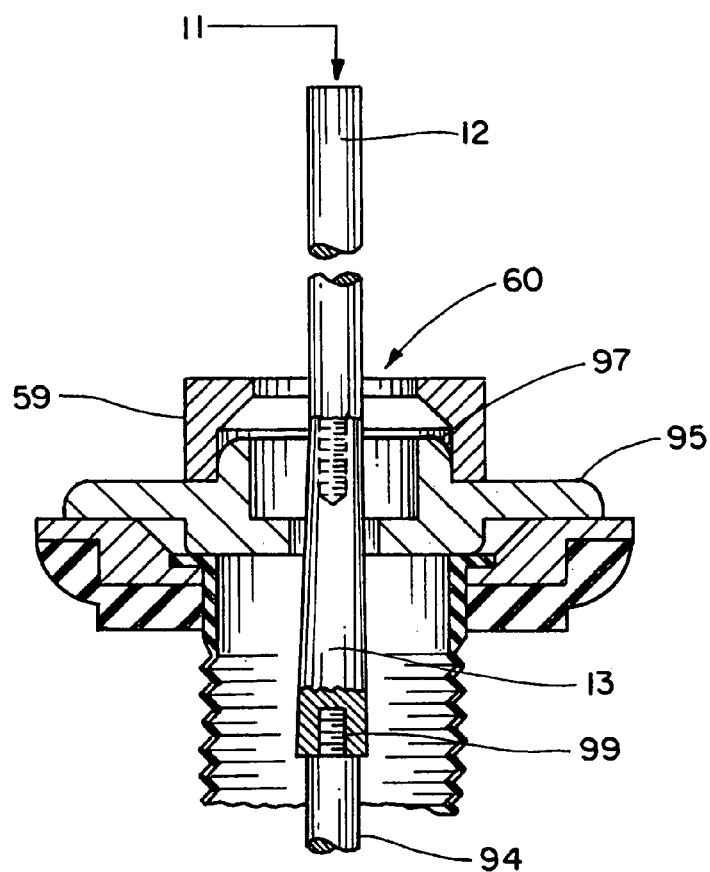
Figure 12:
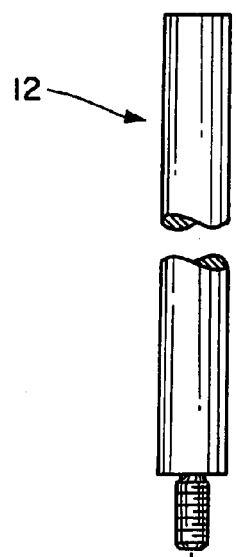
Figure 13:
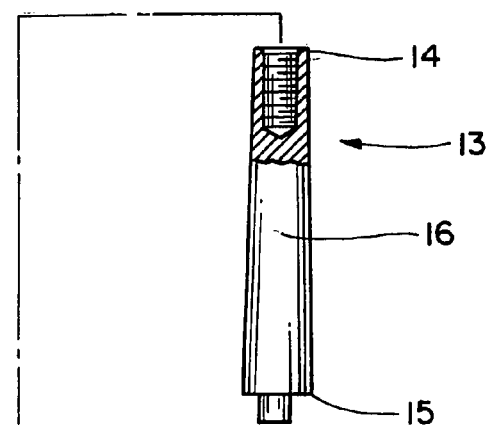

FIG. No. 2 is a side view of a generic strut assembly in a substantially horizontal spatial orientation.

FIG. No. 3 is a side view of the preferred embodiment of the spring-compression apparatus with the generic strut assembly shown in FIG. No. 2 positioned upon the strut support in a substantially vertical spatial orientation.

FIG. No. 3(a) is a fragmentary side view of the spring-compression apparatus depicting anchored attachment of the rest assembly to a ground plane.

FIG. No. 4 is a top plan view of the lock assembly of the spring-compression apparatus.

FIG. No. 4(a) is a side plan view of the lock assembly shown in FIG. No. 4.

FIG. No. 5 is a fragmentary superior end view of the spring-compression apparatus depicting operation of the jack assembly and compression of the strut spring with parts of the guide member broken away to show a portion of the jack assembly.

FIG. No. 6 is a top plan view of the strut assembly in an assembled, spring-compressed state.

FIG. No. 7 is a fragmentary top plan view of the locator assembly in superior adjacency to the assembled strut assembly shown in FIG. No. 6.

FIG. No. 8 is a first fragmentary cross-sectional view of the center locator and spring seat junction depicting socket structure removing the mounting nut from the rod end of the piston rod.

FIG. No. 9 is a side view of the spring-compression apparatus with the generic strut assembly positioned upon the strut support depicting the carriage assembly being operated to compress the strut spring and a piston rod guide assembly shown elevated above the locator assembly.

FIG. No. 10 is a top plan view of the spring seat with the mounting nut and piston rod removed from the rod-receiving aperture.

FIG. No. 11 is a second fragmentary cross-sectional view of the center locator and spring seat junction depicting a piston rod guide assembly guiding the rod end of the piston rod through the rod-receiving aperture.

FIG. No. 12 is a fragmentary side view of the shaft portion of the piston rod guide assembly.

FIG. No. 13 is a side view of the tip portion of the piston rod guide assembly with parts broken away to show female structure.

DETAILED DESCRIPTION OF THE PREFERRED EMBODIMENT

Referring now to the drawings, the preferred embodiment of the present invention generally concerns a spring-compression apparatus or a strut spring compressor for facilitating maintenance of a McPherson-type strut assembly. The spring-compression apparatus 10 of the preferred embodiment is generally illustrated and referenced in FIG. Nos. 1, 3, and 9. A generic McPherson-type strut assembly 90 is generally illustrated and referenced in FIG. Nos. 2, 3, and 9. It will be understood from a general inspection of the noted figures as well as from a general consideration of a generic McPherson-type strut assembly that strut assembly 90 essentially comprises a first strut end 91 as referenced in FIG. Nos. 2, 3, and 9; a strut shaft 92 as generally referenced in FIG. Nos. 2 and 4; a strut spring 93 as illustrated and referenced in FIG. Nos. 2, 3, 5, and 9; a piston rod 94 as illustrated and referenced in FIG. Nos. 2, 3, 5, 8, 9, and 11; a spring seat 95 as generally illustrated and referenced in FIG. Nos. 2, 3, and 5–11; a mounting nut 96 as generally illustrated and referenced in FIG. Nos. 6–8; a second strut end 97 as generally referenced in FIG. Nos. 2, 3, 8, 10, and 11; and a longitudinal strut axis 98 as generally referenced in FIG. No. 2.

Piston rod 94 preferably comprises a threaded rod end 99 as generally illustrated and referenced in FIG. Nos. 6–8, and 11. It will be further understood from an inspection of FIG. No. 2 that strut axis 98 preferably extends through strut shaft 92 and piston rod 94. Notably, spring seat 95 preferably comprises a rod-receiving aperture 100 as generally illustrated and referenced in FIG. Nos. 8 and 10. Mounting nut 96 is preferably threadably received on rod end 99 adjacent rod-receiving aperture 100 for maintaining strut assembly 90 in an assembled, spring-compressed state. It will be understood that strut spring 93 is a compression coil and is under a considerable amount of compression when strut assembly 90 is in an assembled, spring-compressed state. Thus, there is a significant force being directed against spring seat 95 and mounting nut 96 when strut assembly 90 is in an assembled, spring-compressed state. In order to properly and safely remove mounting nut 96, strut spring 93 must first be further compressed so as to remove or otherwise redirect the forces from compressed strut spring 93 away from mounting nut 96 so that mounting nut 96 may be safely removed from rod end 99. In this regard, it is contemplated that redirection of the spring-compressed forces is achieved by the introduction of some other structure that further compresses strut spring 93.

Thus, it is believed that spring-compression apparatus 10 provides an excellent means for properly and safely removing mounting nuts from McPherson-type strut assemblies. Spring-compression apparatus 10 preferably comprises a guide member 20 as generally illustrated and referenced in FIG. Nos. 1, 3, 5, and 9; a carriage assembly 30 as generally illustrated and referenced in FIG. Nos. 1, 3, and 9; and a base or rest assembly 70 as generally illustrated and referenced in FIG. Nos. 1, 3, 3(a), and 9. It will be seen from an inspection of the applicable figures that guide member 20 preferably comprises a first member end 21 as referenced in FIG. Nos. 1, 3, 5, and 9; a second member end 22 as illustrated and referenced in FIG. Nos. 1, 3, 3(a), and 9; and a member length extending intermediate first member end 21 and second member end 22. Further, it is contemplated that guide member 20 inherently comprises a transverse member cross-section, which member cross-section preferably includes at least four sides. In this regard, it is contemplated that the member cross-section be preferably rectangular or square in configuration (the reader may wish to inspect or reference FIG. No. 4). From an inspection of FIG. No. 4, it will be seen that a member-receiving aperture 83 also comprises a squarely shaped cross-section. Guide member 20 is preferably slidably received in member-receiving aperture 83 and thus it is contemplated that a squarely shaped transverse member cross-section is to be preferred.

It is further contemplated that the four sides preferably include a guide side 23 as referenced in FIG. Nos. 1, 3, 5, and 9; a jack side 24 as referenced in FIG. Nos. 1, 3, and 9; and two opposite member sides 25, one of which has been illustrated in FIG. Nos. 1, 3, 3(a), and 9; and both of which have been referenced in FIG. No. 5. It will be further seen that first member end 21 preferably comprises a jack stop 26 as illustrated and referenced in FIG. Nos. 1, 3, 5, and 9. In other words, jack stop 26 may be cooperatively associated with guide member 20 adjacent first member end 21 substantially as generally illustrated in FIG. Nos. 1, 3, 5, and 9. It will be seen that jack stop 26 generally extends outwardly from the longitudinal axis of guide member 20 such that the plane in which jack stop 26 substantially lies is preferably orthogonal to the longitudinal axis of guide member 20. It will be further seen, however, that jack stop 26 extends outwardly from guide member 20 to the furthest extent adjacent jack side 26.

Carriage assembly 30 preferably comprises a jack assembly 40 as generally illustrated and referenced in FIG. Nos. 1, 3, and 9; and a slide assembly 50 as generally illustrated and referenced in FIG. Nos. 1, 3, and 9. Jack assembly 50 preferably comprises a ram jack or jack 41 as referenced in FIG. Nos. 1, 3, 5, and 9; jack extension means, and jack release means. It is contemplated that the jack extension means may be defined by a pump assembly 42 otherwise cooperatively associated with jack 41 and which may be operated (via a pump handle) as generally depicted in FIG. No. 5 at reference numeral 43 to extend jack 41. Pump assembly is further referenced in FIG. Nos. 1, 3, and 9. It is further contemplated that the jack release means may be defined by a release valve 44 or similar other release means typical to common hydraulic or similar other fluid-operated jacks. Release valve 44 has been referenced for the reader's benefit in FIG. Nos. 1, 3, and 9. It will be understood that jack 41 preferably comprises a stop-engaging end 45 as illustrated and referenced in FIG. Nos. 1, 3, and 9; and a pedestal-engaging end 46 as further illustrated in FIG. Nos. 1, 3, and 9.

Slide assembly 50 preferably comprises a jack pedestal 51 as illustrated and referenced in FIG. Nos. 1, 3, and 9; a locator assembly 52 as referenced in FIG. Nos. 1, 3, and 9; and a carriage 55 as illustrated and referenced in FIG. Nos. 1, 3, and 9. Carriage 55 preferably comprises an arm-engaging end 56 as referenced in FIG. Nos. 1, 3, and 9; a pedestal-engaging end 57 as referenced in FIG. Nos. 1, 3, and 9; and a member-receiving tunnel (not specifically illustrated). Guide member 20 is preferably also slidably received in the member-receiving tunnel. In this regard, it will be understood that the member-receiving tunnel also preferably comprises a squarely shaped cross-section and extends from arm-engaging end 56 to pedestal-engaging end 57 so as to more properly (and slidably) receive guide member 20. Thus, it is contemplated that a squarely shaped transverse member-receiving tunnel is to be preferred.

It will be seen from an inspection of the noted figures that locator assembly 52 preferably comprises a locator extension arm 58 as illustrated and referenced in FIG. Nos. 1, 3, 5, 7–9, and 11; and a center locator 59 as illustrated and referenced in FIG. Nos. 1, 3, 5, 8, 9, and 11. Locator assembly 52 further comprises nut access means, which nut access means may preferably be defined by a relatively large nut access aperture 60 formed through locator extension arm 58 and center locator 59 (as referenced in FIG. Nos. 7, 8, and 11). It is further contemplated that center locator 59 (and nut access aperture 60) inherently comprise a longitudinal locator axis as referenced at 61 in FIG. No. 3.

It will thus be understood from a consideration of the noted figures that arm-engaging end 56 is preferably (fixedly) attached to locator extension arm 58 and that pedestal-engaging end 57 is preferably (fixedly) attached to jack pedestal 51. Further, it will be understood that jack pedestal 51 preferably extends outwardly from carriage 55 adjacent jack side 24 and that locator assembly 52 preferably extends outwardly from carriage 55 adjacent guide side 23. Jack 41 thus extends intermediate jack stop 26 and jack pedestal 51, stop-engaging end 45 being (fixedly) attached jack stop 26 and pedestal-engaging end 46 being (fixedly) attached to jack pedestal 51.

Base or rest assembly 70 essentially comprises a strut support or center rest 71 as generally illustrated and referenced in FIG. Nos. 1, 3, 3(a), and 9. The strut support or center rest 71 inherently has a longitudinal rest axis as referenced at 72 in FIG. No. 3. It will thus be seen from an inspection of FIG. No. 3 that it is preferred that rest axis 72 and locator axis 61 be substantially collinear. First strut end 91 of strut assembly 90 is thus positionable upon center rest 71 such that strut axis 98 is also substantially collinear with rest and locator axes 72 and 61. The jack extension means as previously specified are thus operable to extend jack 41 and displace locator assembly 52 toward center rest 71 as may be seen from a comparative inspection of FIG. Nos. 1 and 3 (in tandem) with FIG. No. 9. Center locator 59 is thus engageable with second strut end 97 (as locator assembly 52 is displaced toward center rest 71) for compressing or "apparatus-compressing" strut spring 93. The nut access means as previously specified thus enable a user to remove mounting nut 96 from rod end 99 when strut spring 93 is sufficiently apparatus-compressed. It will be seen from a general inspection of FIG. No. 8 that the nut access means or nut access aperture 60 is sufficiently sized and shaped so as to allow socket structure or a socket 101 to be inserted through the nut access means and cooperatively engage mounting nut 96 for removal thereof. Typically, removal of mounting nut 96 is achieved via either a pneumatically driven socket-outfitted tool or similar other socket-outfitted tool designed for nut removal. The jack release means as previously specified are further operable to retract jack 41 and thus fully decompress strut spring 93 to a relaxed state. Thus, it will be seen that the described spring-compression apparatus 10 enables disassembly of strut assembly 90 and thus facilitates maintenance or repair of strut assembly 90.

In order to more properly maintain the collinearity of rest axis 72, locator axis 61, and strut axis 98, it is contemplated that spring-compression apparatus 10 may further preferably comprise axis maintenance means. The axis maintenance means may preferably be cooperatively associated with guide member 20 and strut shaft 95 for maintaining rest, locator, and strut axes 72, 61, and 98 in substantially collinear relation. The axis maintenance means may preferably be defined by a lock assembly 80 as generally illustrated and referenced in FIG. Nos. 1, 3, 4, 4(a), and 9. Lock assembly 80 preferably comprises a lock arm 81 as illustrated and referenced in FIG. Nos. 1, 3, 4, 4(a), and 9; a shaft claw 82 as illustrated and referenced in FIG. Nos. 1, 3, 4, 4(a), and 9; and claw adjustment means. It will noted from an inspection of the noted figures that lock arm 81 extends outwardly from guide member 20 adjacent guide side 23 so as to position shaft claw 82. It will be recalled that guide member 20 is preferably slidably received in member-receiving aperture 83. Notably, shaft claw 82 inherently has a longitudinal claw axis (not specifically depicted), which claw axis is substantially collinear with rest axis 72 and locator axis 61. It is contemplated that the claw adjustment means may be defined by screw shaft assembly 84 (as generally depicted in FIG. Nos. 4 and 4(a)) as commonly found in workbench vise assemblies and the like.

It is contemplated that spring-compression apparatus 10 may benefit from the claw adjustment means so that variously sized strut shafts 95 may be gripped by lock assembly 80. Thus, the adjustable shaft claw 82 is designed to grip strut shaft 95 and thus maintain strut axis 98 in collinear relationship with rest axis 72 and locator axis 61. As earlier indicated, lock arm 81 comprises member-receiving aperture 83. Guide member 20 is preferably slidably received in member-receiving aperture 83 so that lock arm 81 may be repositioned relative to the member length, again for adjusting to variously configured strut shafts 95. In this regard, it is contemplated that a set screw shaft 85 (as referenced in FIG. Nos. 4 and 4(a)), in conjunction with member-receiving aperture 83, may function to provide lock assembly 80 with member reposition means. Thus, the member reposition means enable a user to reposition lock assembly 80 relative to the member length.

Further, it is contemplated that the inner shaft-gripping surface of shaft claw 82 is preferably V-grooved as generally depicted in FIG. No. 4. It is contemplated that the V-grooved inner surface of shaft claw 82 may function to more properly grip the outer surfaces of strut shafts 95 having varying transverse shaft configurations and/or dimensions. Thus, it is contemplated that shaft claw 82 may preferably comprise shaft accepting means such as the V-grooved inner claw surface for enabling shaft claw 82 to accept at least one transverse shaft configuration. Thus, it is contemplated that the axis maintenance means may be further defined, in part, by the shaft accepting means.

It is further noted that strut assemblies may further vary in terms of second strut end structure and first strut end structure. In this regard, center locator 59 may be outfitted with certain means to accept various second strut ends 97. Further, center rest 71 may be outfitted with certain means to accept various first strut ends 91. Thus, it is contemplated that center locator 59 may preferably comprise second strut end accepting means and that second strut end 97 inherently comprises a second end surface. Further, center rest 71 may preferably comprise first strut end accepting means and first strut end 91 inherently comprises a first end surface. The second end surface inherently has a second end geometric configuration. It is contemplated that the second end accepting means is designed to enable center locator 59 to accept at least one second end geometric configuration. In other words, center locator 59 may preferably comprise an inner, conically-shaped locator surface for accepting and centrally locating second strut end 97, thus further functioning to maintain strut axis 98 in collinear relation with rest axis 72 and locator axis 61. Further, the first end surface inherently has a first end geometric configuration. It is contemplated that the first strut end accepting means is designed to enable center rest 71 to accept at least one first end geometric configuration. Thus, it is contemplated that the axis maintenance means may be further defined by the second strut end accepting means and the first strut end accepting means.

It is further contemplated that spring-compression apparatus 10 may further preferably comprise carriage return means for displacing carriage assembly 30 toward first member end 21 when strut spring 93 is in a relaxed or fully decompressed state. In this regard, it is contemplated that the carriage return means may be defined by at least one, but preferably two elastic members 86. Elastic members 86 are preferably extension coils, one of which is referenced in FIG. Nos. 1, 3, and 9 and both of which are illustrated and referenced in FIG. No. 5. It will be recalled that jack stop 26, in addition to extending outwardly from guide member 20 adjacent jack side 24, also extends outwardly from guide member 20 (to a lesser extent) from guide side 23 and member sides 25. It will be seen from an inspection of FIG. No. 5, in particular, that jack stop 26 extends outwardly from guide member 20 adjacent member sides 25.

Each elastic member 86 or extension coil comprises a stop end 87 and a carriage end 88 as referenced in FIG. No. 5. Each stop end 87 is preferably attached to jack stop 26 and each carriage end 88 is preferably attached to locator extension arm 58 of slide assembly 50. Thus, each elastic member 86 extends intermediate jack stop 26 and slide assembly 50 adjacent one of member sides 25. Each elastic member 86 thus inherently has an assembly-equilibrium length as defined by the length of each elastic member 86 when holding carriage assembly 30 in a spatial location uninfluenced by forces emanating from strut spring 93 as generally depicted in FIG. Nos. 1 and 3. Thus, the assembly-equilibrium length maintains a strut removal distance, which extends intermediate center locator 59 and the superior most portion of center rest 71 for enabling a user to remove or insert (and thus position) strut assembly 90 relative to center rest 71.

The base or rest assembly 70 may further preferably comprise select interface structure, the select interface structure being selected from the group comprising apparatus displacement means and apparatus anchor means. It is contemplated that the apparatus displacement means is designed provide spring-compression apparatus 10 with portability and thus may be defined by rail means for movement or roller means for movement, the latter of which has been generally depicted in FIG. Nos. 1, 3, and 9 at 73. It is further contemplated that the apparatus anchor means is designed to provide spring-compression apparatus 10 with fixed placement and thus may be defined by anchors or posts, which function to anchor spring-compression apparatus 10 to a ground plane or other attachment plane as generally depicted in FIG. No. 3(*a*) at 74.

Once disassembled, strut assembly 90 may be properly maintained or repaired as needed. To reassemble strut assembly 90, it is necessary to recompress strut spring 93 and redirect rod end 99 of piston rod 94 through rod-receiving aperture 100 of spring seat 95 so that mounting nut 96 may be rethreaded upon rod end 99 for maintaining strut assembly 90 in an assembled, spring-compressed state. It will be recalled that strut spring 93 is a compression coil and is under a considerable amount of compression when strut assembly 90 is in an assembled, spring-compressed state. Thus, it will be understood that in order to reassemble strut assembly 90, a significant amount of force is required to recompress strut spring 93. Often it is difficult to maintain the necessary alignment of strut axis 98 with rest axis 72 and locator axis 61 so that rod end 99 may be received in rod-receiving aperture 100. In an effort to provide means for maintaining necessary axis alignment of piston rod 94 for reassembly purposes, it is contemplated that spring-compression apparatus 10 may further preferably comprise piston rod guide means, the piston rod guide means for guiding rod end 99 through rod-receiving aperture 100 when a user reassembles an otherwise disassembled strut assembly 90.

The piston rod guide means may preferably be defined by a guide rod assembly 11 as illustrated and referenced in FIG. Nos. 9 and 11. It will be understood that rod-receiving aperture 100 inherently comprises a structural boundary having a peripheral boundary dimension. Guide rod assembly 11 preferably comprises a shaft portion 12 as illustrated and referenced in FIG. Nos. 9, 11, and 12; and a tip portion 13 as illustrated and referenced in FIG. Nos. 9, 11, and 13. Shaft portion 12 inherently has a transverse shaft cross-section, which shaft cross-section inherently has a peripheral shaft dimension. The peripheral shaft dimension is preferably lesser in magnitude than the peripheral boundary dimension of rod-receiving aperture 100. Tip portion 13 inherently has a shaft end 14, an aperture end 15, an outer tip surface 16, and rod end mate means as referenced and generally depicted in FIG. No. 13. Shaft end 14 inherently has a transverse shaft end cross-section, the shaft end cross-section being substantially identical to the shaft cross-section. Shaft end 14 is preferably removably attachable to shaft portion 12 as generally depicted from a comparative inspection of FIG. Nos. 9, and 11–13.

The rod end mate means is designed for cooperatively mating aperture end 15 with rod end 99. In this regard, it is noted that rod ends 99 may also vary from one strut assembly to another. Thus, it is contemplated that any given aperture end 15 may be formed to accept a given rod end 99 and thus a number of tip portions 15 may be designed and interchanged with shaft portion 12 since shaft end 14 is removably attachable to shaft portion. Further, the rod end mate means may comprise female structure or male structure depending on the structural terminus of rod end 99 (i.e. the terminus of rod end may comprise female structure or male structure depending on the manufacture thereof). Aperture end 15 inherently has a transverse aperture end cross-section. It will be seen from an inspection of FIG. Nos. 11 and 13 that outer tip surface 16 is preferably sloped from shaft end 14 to aperture end 15 such that the aperture end cross-section may more effectively guide the rod end mate means and rod end 99 through the structural boundary (of rod-receiving aperture 100) when strut spring 93 is apparatus-compressed. Thus, it will be understood that guide rod assembly 11 enables a user to expose rod end 99 adjacent rod-receiving aperture 100 so that the user may replace or rethread mounting nut 96 upon rod end 99 when strut spring 93 is apparatus-compressed for reassembly purposes. Thus, it is contemplated that the axis maintenance means may be further defined by the piston guide rod means.

While the above description contains much specificity, this specificity should not be construed as limitations on the scope of the invention, but rather as an exemplification of the invention. For example, it is believed that the spirit of the present invention discloses a spring compression apparatus comprising a guide member, a carriage assembly, and a rest assembly or strut support. The guide member essentially comprises a first member end, a second member end, and a member length extending intermediate the first member end and the second member end. The carriage assembly essentially comprises carriage displacement means (such as the carriage return means or jack extension means or jack release means), member engagement means (such as the member-receiving tunnel), and a strut contact (such as center locator 59). The guide member is cooperatively associated with the member engagement means for guiding carriage assembly displacement and the carriage displacement means enables carriage assembly displacement. The strut contact contacts the second strut end and comprises nut access means and a longitudinal locator axis.

The rest assembly or strut support is cooperatively associated with the first member end and comprising a center rest inherently having a longitudinal rest axis. The rest axis and the locator axis are substantially collinear. The first strut end is positionable upon the center rest such that the strut axis is substantially collinear with the rest and locator axes. The carriage displacement means are operable to displace the strut contact of the carriage assembly toward the center rest and the strut contact is engageable with the second strut end for apparatus-compressing the strut spring. The nut access means enable a user to remove the mounting nut from the rod end when the strut spring is apparatus-compressed. The carriage displacement means are further operable to displace the strut contact away from the center rest to allow full decompression of the strut spring and disassembly of the strut assembly. The spring-compression apparatus thus facilitates maintenance of the strut assembly.

Thus, at its essence, the present invention discloses an apparatus for facilitating maintenance of a strut assembly, the apparatus comprising spring compression means (guide member and carriage assembly), nut access means, and rod guide means. The spring compression means are operable to apparatus-compress a strut spring of the strut assembly. The spring compression means comprise the nut access means for enabling a user to remove a mounting nut from the strut assembly when the strut spring is apparatus-compressed, thus enabling strut assembly disassembly. The rod guide means function to guide a rod end of the strut assembly when a user reassembles the disassembled strut assembly, the rod end being guided through a rod-receiving aperture of the strut assembly. The rod end receives the mounting nut, and the received mounting nut maintains the strut assembly in an assembled, spring-compressed state.

Accordingly, although the invention has been described by reference to a preferred embodiment, it is not intended that the novel assembly or apparatus be limited thereby, but that modifications thereof are intended to be included as falling within the broad scope and spirit of the foregoing disclosure, the following claims and the appended drawings.

I claim:

1. A spring-compression apparatus for facilitating maintenance of a strut assembly, the strut assembly comprising a first strut end, a strut shaft, a strut spring, a piston rod, a spring seat, a mounting nut, a second strut end, and a longitudinal strut axis, the piston rod having a threaded rod end, the strut axis extending through the strut shaft and the piston rod, the spring seat comprising a rod-receiving aperture, the mounting nut being threadably received on the rod end adjacent the rod-receiving aperture for maintaining the strut assembly in an assembled, spring-compressed state, the spring-compression apparatus comprising:

a guide member, the guide member comprising a first member end, a second member end, an member length extending intermediate the first member end and the second member end, and a transverse member cross-section, the member cross-section comprising at least four sides, the four sides including a guide side, a jack side, and opposite member sides, the first member end comprising a jack stop, the jack stop extending outwardly from the guide member adjacent the jack side;

a carriage assembly, the carriage assembly comprising a jack assembly and a slide assembly, the jack assembly comprising a jack, jack extension means, and jack release means, the jack comprising a stop-engaging end and a pedestal-engaging end, the slide assembly comprising a jack pedestal, a locator assembly, and a carriage, the carriage comprising an arm-engaging end, a pedestal-engaging end, and a member-receiving tunnel, the guide member being slidably received in the member-receiving tunnel, the locator assembly comprising a locator extension arm, a center locator, nut access means, and a longitudinal locator axis, the arm-engaging end being attached to the locator extension arm, the pedestal-engaging end being attached to the jack pedestal, the jack pedestal extending outwardly from the carriage adjacent the jack side, the locator assembly extending outwardly from the carriage adjacent the guide side, the jack extending intermediate the jack stop and the jack pedestal, the stop-engaging end being attached to jack stop, the pedestal-engaging end being attached to the jack pedestal; and a rest assembly, the rest assembly comprising a center rest, the center rest having a longitudinal rest axis, the rest axis and the locator axis being substantially collinear, the first strut end being positionable upon the center rest such that the strut axis is substantially collinear with the rest and locator axes, the jack extension means being operable to extend the jack and displace the locator assembly toward the center rest, the center locator being engageable with the second strut end for apparatus-compressing the strut spring, the nut access means for enabling a user to remove the mounting nut from the rod end when the strut spring is apparatus-compressed, the jack release means being operable to retract the jack and fully decompress the strut spring, the spring-compression apparatus enabling strut assembly disassembly, thus facilitating maintenance of the strut assembly.

2. The spring-compression apparatus of claim 1 wherein the spring-compression apparatus comprises axis maintenance means, the axis maintenance means being cooperatively associated with the strut shaft for maintaining the rest, locator, and strut axes in substantially collinear relation.

3. The spring-compression apparatus of claim 2 wherein the axis maintenance means is defined by a lock assembly, the lock assembly comprising a lock arm, a shaft claw, and claw adjustment means, the lock arm extending from the guide member adjacent the guide side for positioning the shaft claw, the shaft claw having a longitudinal claw axis, the claw axis being substantially collinear with the rest and locator axes, the claw adjustment means for adjusting the shaft claw, the shaft claw for gripping the strut shaft.

4. The spring-compression apparatus of claim 3 wherein the lock assembly comprises member reposition means, the member reposition means enabling a user to reposition the lock assembly relative to the member length.

5. The spring-compression apparatus of claim 3 wherein the shaft claw comprises shaft accepting means and the strut shaft comprises an outer shaft surface, the outer shaft surface having a transverse shaft configuration, the shaft accepting means enabling the shaft claw to accept at least one transverse shaft configuration.

6. The spring-compression apparatus of claim 1 wherein the spring-compression apparatus comprises carriage return means, the carriage return means for displacing the carriage assembly toward the first member end when the strut spring is in a relaxed state.

7. The spring-compression apparatus of claim 6 wherein the carriage return means is defined by two elastic members, the jack stop extending outwardly from the guide member adjacent the member sides, each elastic member comprising a stop end and a carriage end, each stop end being attached to the jack stop, each carriage end being attached to the slide assembly, each elastic member extending intermediate the jack stop and the slide assembly adjacent one of the member sides, each elastic member having an assembly-equilibrium length, the assembly-equilibrium length for maintaining a strut removal distance, the strut removal distance extending intermediate the center locator and the first strut end for enabling a user position the strut assembly relative to the center rest.

8. The spring-compression apparatus of claim 1 wherein the rest assembly comprises select interface structure, the select interface structure being selected from the group comprising apparatus displacement means and apparatus anchor means, the apparatus displacement means for providing the spring-compression apparatus with portability, the apparatus anchor means for providing the spring-compression apparatus with fixed placement.

9. The spring-compression apparatus of claim 1 wherein the center locator comprises second strut end accepting means, the second strut end comprises a second end surface, the center rest comprises first strut end accepting means, and the first strut end comprises a first end surface, the second end surface having a second geometric configuration, the second end accepting means for enabling the center locator to accept at least one second geometric configuration, the first end surface having a first geometric configuration, the first strut end accepting means enabling the center rest to accept at least one first geometric configuration.

10. The spring-compression apparatus of claim 1 wherein the spring-compression apparatus comprises piston rod guide means, the piston rod guide means for guiding the rod end through the rod-receiving aperture when a user reassembles each disassembled strut assembly.

11. The spring-compression apparatus of claim 10 wherein the piston rod guide means is defined by a guide rod assembly and the rod-receiving aperture comprises a structural boundary, the structural boundary having a peripheral boundary dimension, the guide rod assembly comprising a shaft portion and a tip portion, the shaft portion having a transverse shaft cross-section, the shaft cross-section having a peripheral shaft dimension, the peripheral shaft dimension being lesser in magnitude than the peripheral boundary dimension, the tip portion having a shaft end, an aperture end, an outer tip surface, and rod end mate means, the shaft end having a transverse shaft end cross-section, the shaft end cross-section being substantially identical to the shaft cross-section, the shaft end being attached to the shaft portion, the rod end mate means for cooperatively mating the tip end with the rod end, the aperture end having a transverse aperture end cross-section, the outer tip surface being sloped from the shaft end to the aperture end such that the aperture end cross-section may guide the rod end mate means and the rod end through the structural boundary when the strut spring is apparatus-compressed, the guide rod assembly thus enabling a user to expose the rod end for replacing the mounting nut thereupon when the strut spring is apparatus-compressed.

12. An apparatus for facilitating maintenance of a strut assembly, the strut assembly comprising a first strut end, a strut shaft, a strut spring, a piston rod, a spring seat, a mounting nut, a second strut end, and a longitudinal strut axis, the piston rod having a threaded rod end, the strut axis extending through the strut shaft and the piston rod, the spring seat comprising a rod-receiving aperture, the mounting nut being threadably received on the rod end adjacent the rod-receiving aperture for maintaining the strut assembly in an assembled, spring-compressed state, the apparatus comprising:

a guide member, the guide member comprising a first member end, a second member end, and a member length extending intermediate the first member end and the second member end;

a carriage assembly, the carriage assembly comprising carriage displacement means, member engagement means, and a strut contact, the guide member being cooperatively associated with the member engagement means for guiding carriage assembly displacement, the carriage displacement means for enabling carriage assembly displacement, the strut contact for contacting the second strut end, the strut contact comprising nut access means and a longitudinal locator axis; and a rest assembly, the rest assembly being cooperatively associated with the first member end and comprising a center rest, the center rest having a longitudinal rest axis, the rest axis and the locator axis being substantially collinear, the first strut end being positionable upon the center rest such that the strut axis is substantially collinear with the rest and locator axes, the carriage displacement means being operable to displace the strut contact of the carriage assembly toward the center rest, the strut contact being engageable with the second strut end for apparatus-compressing the strut spring, the nut access means for enabling a user to remove the mounting nut from the rod end when the strut spring is apparatus-compressed, the carriage displacement means being operable to displace the strut contact away from the center rest to allow full decompression of the strut spring and disassembly of the strut assembly, the spring-compression apparatus thus for facilitating maintenance of the strut assembly.

13. The spring-compressing apparatus of claim 12 wherein the spring-compression apparatus comprises axis maintenance means, the axis maintenance means being cooperatively associated with the strut shaft for maintaining the rest, locator, and strut axes in substantially collinear relation.

14. The spring-compressing apparatus of claim 12 wherein the carriage-displacement means comprises carriage return means, the carriage return means for displacing the carriage assembly toward the second member end when the strut spring is in a relaxed state.

15. The spring-compressing apparatus of claim 12 wherein the rest assembly comprises select interface structure, the select interface structure being selected from the group comprising apparatus displacement means and apparatus anchor means, the apparatus displacement means for providing the spring-compressing apparatus with portability, the apparatus anchor means for providing the spring-compression apparatus with fixed placement.

16. The spring-compressing apparatus of claim 12 wherein the apparatus comprises piston rod guide means, the piston rod guide means for guiding the rod end through the rod-receiving aperture when a user reassembles the disassembled strut assembly.

17. An apparatus for facilitating maintenance of a strut assembly, the apparatus comprising:

a guide member, the guide member comprising a first member end, a second member end, and a member length extending intermediate the first member end and the second member end;

a carriage assembly, the carriage assembly comprising carriage displacement means, member engagement means, and a strut contact, the guide member being cooperatively associated with the member engagement means for guiding carriage assembly displacement, the carriage displacement means for enabling carriage assembly displacement, the strut contact for contacting a second strut end, the strut contact comprising nut access means and a longitudinal locator axis; and axis maintenance means, the axis maintenance means for maintaining a strut axis in substantially collinear relation with the locator axis, the carriage displacement means being operable to displace the strut contact toward the second strut end, the strut contact being engageable with the second strut end for apparatus-compressing a strut spring, the nut access means for enabling a user to remove a mounting nut from the strut assembly adjacent the second strut end when the strut spring is apparatus-compressed, the carriage displacement means being operable to displace the strut contact away from the strut support and allow full decompression of the strut spring, the spring-compression apparatus thus for facilitating maintenance of the strut assembly.

18. The apparatus of claim 17 wherein the apparatus comprises a strut support, the strut support comprising a center rest, the center rest having a longitudinal rest axis, the rest axis and the locator axis being substantially collinear, the first strut end being positionable upon the center rest such that the strut axis is substantially collinear with the rest and locator axes.

19. The apparatus of claim 17 wherein the apparatus comprises select interface structure, the select interface structure being selected from the group comprising apparatus displacement means and apparatus anchor means, the apparatus displacement means for providing the spring-compressing apparatus with portability, the apparatus anchor means for providing the spring-compression apparatus with fixed placement.

20. The apparatus of claim 17 wherein the apparatus comprises rod guide means, the rod guide means for guiding a rod end of the strut assembly when a user reassembles the disassembled strut assembly, the rod end being guided through a rod-receiving aperture adjacent the second strut end, the rod end for receiving the mounting nut, the received mounting nut for maintaining the strut assembly in an assembled, spring-compressed state.

21. An apparatus for facilitating maintenance of a strut assembly, the apparatus comprising:
   spring compression means, the spring compression means being operable to apparatus-compress a strut spring of the strut assembly;
   nut access means, the nut access means for enabling a user to remove a mounting nut from the strut assembly when the strut spring is apparatus-compressed, thus enabling strut assembly disassembly; and
   a piston rod guide member, the guide member being insertable through the nut access means, the guide member thus for guiding a piston rod end of the strut assembly coaxial with the nut access means and the strut assembly when a user reassembles the disassembled strut assembly, the piston rod end being guided through a rod-receiving aperture of the strut assembly via the guide member, the piston rod end for receiving the mounting nut, the received mounting nut for maintaining the strut assembly in an assembled, spring-compressed state.

* * * * *